United States Patent
Takeuchi

(10) Patent No.: US 8,711,902 B2
(45) Date of Patent: Apr. 29, 2014

(54) SYNCHRONIZATION PROCESSING CIRCUIT AND SYNCHRONIZATION PROCESSING METHOD IN WIRELESS COMMUNICATION SYSTEM

(75) Inventor: Toshiki Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 170 days.

(21) Appl. No.: 13/144,481

(22) PCT Filed: Dec. 21, 2009

(86) PCT No.: PCT/JP2009/071237
§ 371 (c)(1),
(2), (4) Date: Jul. 13, 2011

(87) PCT Pub. No.: WO2010/082431
PCT Pub. Date: Jul. 22, 2010

(65) Prior Publication Data
US 2011/0274226 A1    Nov. 10, 2011

(30) Foreign Application Priority Data

Jan. 15, 2009    (JP) .................................. 2009-007039

(51) Int. Cl.
*H04B 1/00* (2006.01)
(52) U.S. Cl.
USPC ........... 375/149; 375/324; 375/342; 375/343; 375/150; 375/140; 375/142; 375/148
(58) Field of Classification Search
USPC ......... 375/149, 140, 142, 148, 150, 324, 342, 375/343; 327/164; 370/203, 208, 209, 320, 370/335, 342, 441, 479
See application file for complete search history.

(56) References Cited

U.S. PATENT DOCUMENTS 6,307,878 B1    10/2001    Sokolov et al.
6,882,682 B1 *   4/2005    Tanaka .......................... 375/150

FOREIGN PATENT DOCUMENTS

| JP | 2000115148 A | 4/2000 |
| JP | 2001326588 A | 11/2001 |
| JP | 3358170 B | 12/2002 |
| JP | 3399420 B | 4/2003 |
| JP | 2003152600 A | 5/2003 |
| JP | 2004254326 A | 9/2004 |
| JP | 2005522932 A | 7/2005 |
| JP | 2006203354 A | 8/2006 |
| JP | 2007104729 A | 4/2007 |

OTHER PUBLICATIONS

International Search Report for PCT/JP2009/071237 mailed Jan. 26, 2010.

* cited by examiner

*Primary Examiner* — Dhaval Patel
(74) *Attorney, Agent, or Firm* — Sughrue Mion, PLLC

(57) ABSTRACT

In a synchronization processing circuit in a wireless communication system, a correlation operation unit is designed to have a parallel structure which can be restructured to improve flexibility in order to cope with various synchronization processings in a plurality of radio systems.

The synchronization processing circuit in the wireless communication system comprises a plurality of correlation operation modules 31 through 3N that execute correlation operation, each of which correlation operation modules includes a plurality of correlators 60, a plurality of shift registers 50 for shifting a correlation code, an interface which transfers a shifted correlation code to an adjacent correlation operation unit for timing correlation processing, and a correlation code selection unit 40 which selects an externally and individually applied correlation code for code correlation processing and a correlation code transferred from an adjacent correlation operation unit as the correlation code.

19 Claims, 14 Drawing Sheets

(a) AT THE TIME OF TIMING CORRELATION PROCESSING (b) AT THE TIME OF CODE CORRELATION PROCESSING (a) FOR LTE  (b) FOR W-CDMA

SYNCHRONIZATION PROCESSING CIRCUIT AND SYNCHRONIZATION PROCESSING METHOD IN WIRELESS COMMUNICATION SYSTEM

INCORPORATION BY REFERENCE

This application is the National Phase of PCT/JP2009/071237, filed Dec. 21, 2009, which is based upon and claims the benefit of priority from Japanese patent application No. 2009-007039, filed on Jan.15, 2009, the disclosure of which is incorporated herein in its entirety by reference.

TECHNICAL FIELD

The present invention relates to a synchronization processing circuit in a wireless communication system and, more particularly, techniques of parallelization, reconstructing and improving flexibility of a correlation operation unit for coping with various synchronization processings in a plurality of radio systems.

BACKGROUND ART

Wireless communication system requires synchronization processing for setting up synchronization between a base station side and a terminal side or between terminals. Such synchronization processing needs various correlation operation processings such as a first stage (timing correlation processing) and a second stage (code correlation processing) of cell search processing, and path search processing (timing correlation processing), for example. Timing correlation processing here represents processing of executing correlation processing with respect to the same correlation code (hereinafter, simply referred to as a code in some cases) at a plurality of timings to detect a peak, thereby detecting timing as a reference of a transmission/reception data signal. Code correlation processing here represents processing of executing correlation processing with respect to a plurality of correlation codes at obtained one reference timing to detect a peak, thereby detecting a desired code. Timing correlation processing and code correlation processing are in general realized by using a dedicated circuit such as a matched filter or a sliding correlator. However, since such correlation operation processing requires a large amount of arithmetic operation, efficient parallelization and speed-up of processing to be realized by sharing codes, data, correlators and the like are demanded.

Related art for solving the problem is recited in, for example, Patent Literature 1. Proposed in Patent Literature 1 is a technique of sharing each correlator with a synchronization processing circuit allowed to switch between a synchronization detection mode and a data detection mode. According to the related art recited in Patent Literature 1, a sliding correlator allowed to switch between the synchronization detection mode and the data detection mode is provided to execute correlation processing with respect to reception data signals by synchronization detection correlation coefficients of phases different from each other in the synchronization detection mode to detect correlation timing and after detecting the timing, switch to the data detection mode to execute correlation processing in a plurality of data spread sequences at the timing in question, thereby obtaining reception data.

While the related art recited in Patent Literature 1 has an advantage of effective use of each correlator by sharing the same in the synchronization detection mode and the data detection mode, however, because of the structure in which each correlator requires a code generator each for synchronization detection and data detection, when the number of kinds of corresponding codes is increased, the problems occur that rectification of as many circuits as the number of correlators is required and that the circuit scale will be increased in proportion to the number of correlators to result in having low efficiency and low expandability.

Other related art is recited, for example, in Patent Literature 2. Proposed in Patent Literature 2 is a technique for speed-up by dividing an entire phase range into four search ranges and allocating each search range to each of four complex correlator units at the time of capturing synchronization. Disclosed as related art in Patent Literature 2 is an example of a technique of speeding up synchronization set-up by allocating four synchronization search ranges to four complex correlators, respectively.

The related art recited in Patent Literature 2 also has the problems that the same spread code which differs only in phase is generated in each correlator unit and that since the circuit structure is dedicated for timing correlation processing, further sharing of the circuit with other code correlation processing and the like is difficult.

Further related art is recited, for example, in Patent Literature 3. Proposed in Patent Literature 3 is a technique of selecting a user code for each correlator set, selecting one of reception data signals at a plurality of antennas by each correlator in the correlator set and inputting the selected signal to execute restructuring for which antenna signal each correlator should execute correlation processing.

While the related art recited in Patent Literature 3 has an advantage that for which antenna signal each correlator should execute correlation processing can be restructured, a problem occurs that for obtaining the advantage, a selector which selects one of as many data reception signals as the number of antennas is required for each correlator, resulting in having an extremely large overhead in circuit scale. Further problem is that since a user code is input to each correlator set, when processing the same user code whose timing differs by a plurality of correlator sets, each user code should be generated individually.

Patent Literature 1: Japanese Patent Laying-Open No. 2006-203354
Patent Literature 2: Japanese Patent Laying-Open No. 2000-115148
Patent Literature 3: Japanese Patent Laying-Open No. 2007-104729.

First problem is that none of the above-described related art recited in Patent Literature 1 through 3 enables a synchronization processing circuit in a wireless communication system to cope with both timing correlation processing and code correlation processing efficiently.

The reason is that while for a wireless communication terminal to synchronize with a base station, cell search processing is required of detecting reception timing and a base station code from the base station, an enormous amount of arithmetic operation is required for simultaneously detecting both timing and a code. Therefore, generally employed is a method called multistage cell search, that is, a method of establishing synchronization with a base station in stages by detecting reception timing by timing correlation processing at a first stage and detecting a base station code by code correlation processing at the detected reception timing at second and third stages. Accordingly, sharing a synchronization processing circuit in the first and second (third stage) stages or in path search processing is crucial in terms of an effective use of the synchronization processing circuit (operating ratio). However, mounting both code generators on each correlator causes a large overhead in circuit scale, which is a disadvantage in efficient realization. In addition, since in timing correlation processing, in particular, the necessary amount of processing is enormous in general to invite further parallelization which needs speed-up.

Second problem is that the above-described related art recited in Patent Literature 1 through 3 fails to enable parallel execution of a plurality of synchronization processings by a synchronization processing circuit in a wireless communication system and fails to allow assignment of the number of correlation operation units to each synchronization processing to be changed.

The reason is that in general, synchronization processing requires an enormous amount of arithmetic operation in correlation operation in particular and since the faster a processing result can be obtained, the more improved is synchronization performance accordingly, it is better for cell search processing and path search processing or the like to be executed in parallel. Another reason is that if the number of correlation operation units that can be used in each synchronization processing executed in parallel is fixed, when any of required processing performances is improved or when efficient load distribution processing is required taking each required performance into consideration, the correlation operation units cannot be efficiently used with each other.

Third problem is that the above-described related art recited in Patent Literature 1 through 3 fails to flexibly cope with various kinds of synchronization processings in a plurality of radio systems.

The reason is that since contents and codes of synchronization processing in general largely depend on specification of each radio system and the required amount of arithmetic operation is relatively large, synchronization is realized by mounting a dedicated synchronization processing circuit for each radio system.

Along with improvement in a processing capacity caused by recent scale-up and speed-up of a system LSI or the like, realization of a general-purpose synchronization processing circuit will be demanded hereafter which is capable of coping with a plurality of radio systems by the same hardware circuit and efficiently coping with a plurality of radio systems called a multi-mode radio or a software defined radio (SDR). For the realization of a multi-mode radio (software defined radio) in particular, demanded is a technique of efficiently realizing a structure, with less overhead in circuit scale, which allows the number of correlation operation units that execute parallel processing to be changed according to a required processing performance of each synchronization processing by using the same circuit.

OBJECT OF THE INVENTION

An object of the present invention is to provide a synchronization processing circuit and a synchronization processing method in a wireless communication system which is capable of efficiently coping with both timing correlation processing and code correlation processing in the synchronization processing circuit in the wireless communication system.

Another object of the present invention is to provide a synchronization processing circuit and a synchronization processing method in a wireless communication system with high flexibility and expandability which enables parallel execution of a plurality of synchronization processings and in such execution, allows the number of correlation operation units to be assigned to each synchronization processing to be varied.

SUMMARY

According to a first exemplary aspect of the invention, a synchronization processing circuit in a wireless communication system, includes
a plurality of correlation operation units mounted with a plurality of correlators which execute correlation operation, and
a unit which selectively switches, on the correlation operation unit basis, timing correlation processing of shifting a correlation code and transferring the shifted code between adjacent correlators in the correlation operation unit and transferring the shifted correlation code to other adjacent correlation operation unit to execute correlation operation with respect to reception data at different timing in each correlation operation unit and code correlation processing of executing correlation operation with respect to reception data at the same timing in each correlation operation unit by a correlation code individually and externally applied to each correlation operation unit.

According to a second exemplary aspect of the invention, a synchronization processing circuit in a wireless communication system, comprising
a plurality of correlation operation units which execute correlation operation, wherein
the correlation operation unit comprises
a plurality of correlators,
a plurality of shift units which shift a correlation code,
an interface which transfers the correlation code shifted to an adjacent correlation operation unit for timing correlation processing, and
a first correlation code selection unit which selects an externally and individually applied correlation code for code correlation processing and a correlation code transferred from an adjacent correlation operation unit as the correlation code.

According to a third exemplary aspect of the invention, a synchronization processing method of a synchronization processing circuit in a wireless communication system, wherein
in a plurality of correlation operation units mounted with a plurality of correlators which execute correlation operation,
selectively switching, on the correlation operation unit basis, timing correlation processing of shifting a correlation code and transferring the shifted code between adjacent correlators in the correlation operation unit and transferring the shifted correlation code to other adjacent correlation operation unit to execute correlation operation with respect to reception data at different timing in each correlation operation unit and code correlation processing of executing correlation operation with respect to reception data at the same timing in each correlation operation unit by a correlation code individually and externally applied to each correlation operation unit.

According to a fourth exemplary aspect of the invention, a synchronization processing method of a synchronization processing circuit in a wireless communication system, wherein
in a plurality of correlation operation units mounted with a plurality of correlators which execute correlation operation,
shifting a correlation code by a plurality of shift units,
transferring the correlation code shifted to an adjacent correlation operation unit for timing correlation processing, and
selecting an externally and individually applied correlation code for code correlation processing and a correlation code transferred from an adjacent correlation operation unit as the correlation code.

The present invention enables the same synchronization processing circuit to efficiently cope with both timing correlation processing of executing correlation operation by using the same correlation code at different reception timing and code correlation processing of executing correlation operation by using a different correlation code at the same reception timing.

Also realized is a synchronization processing circuit whose flexibility and expandability are high and which enables a plurality of synchronization processings to be executed in parallel and the number of correlation operation units to be assigned to each synchronization processing to be varied in that case.

EXEMPLARY EMBODIMENT

Next, modes of implementation of the present invention will be described in detail with reference to FIG. 1 through FIG. 15 in the following. In a first mode of implementation, detailed description will be made of basic structure and features, and operation of a synchronization processing circuit in a wireless communication system. In a second mode of implementation, an example of a synchronization processing circuit will be detailed in particular in a case where parallel processing of a plurality of synchronization processings is not required. In a third mode of implementation, detailed description will be made of a case where the internal part of each correlation operation module is parallelized in order to speed up oversampling processing.

(First Mode Of Implementation)

Figure 1:
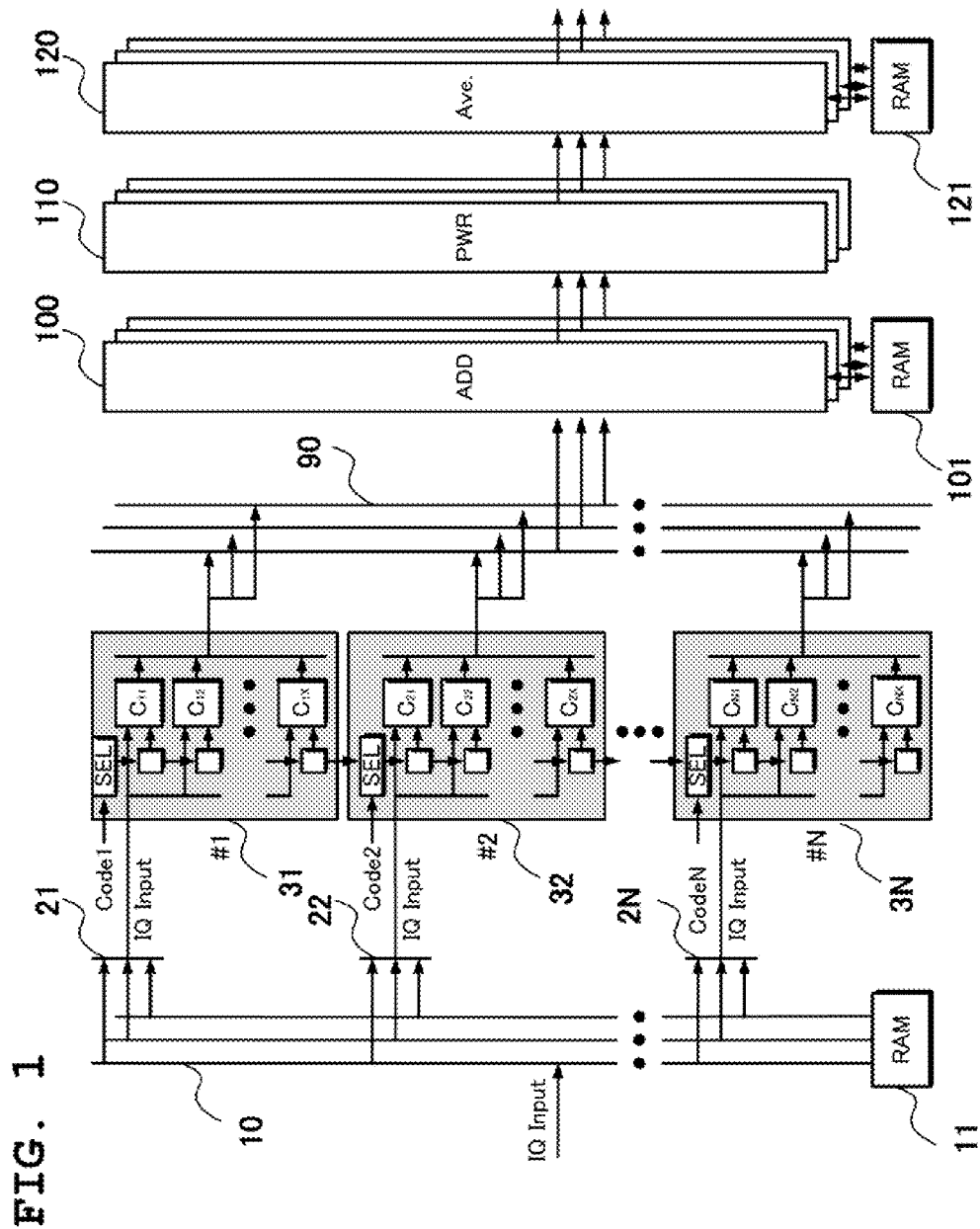
FIG. 1 is a block diagram showing an entire structure of a synchronization processing circuit according to a first mode of implementation of the present invention.
Figure 2:
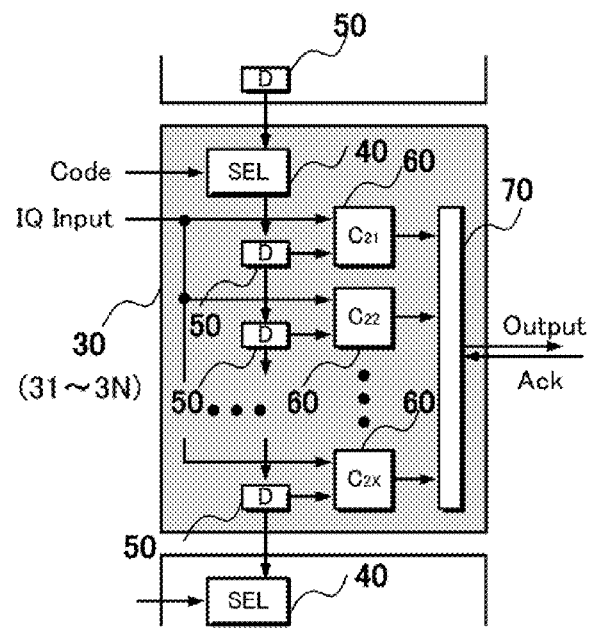
FIG. 2 is a block diagram showing a structure of a correlation operation module according to the first mode of implementation of the present invention.

FIG. 1 is a block diagram showing an example of a structure of a synchronization processing circuit in a wireless communication system according to the first mode of implementation of the present invention. Shown here is an entire structure of a layered parallel structure in which with a correlation operation module having a plurality (four or eight) of correlators mounted as one unit, for example, a plurality (a number N of modules in the example in FIG. 1) of the correlation operation modules are mounted. FIG. 2 is a block diagram showing an example of a structure of each correlation operation module according to the first mode of implementation.

Shown in FIG. 1 is an example of a structure in which the entire synchronization processing circuit is parallelized to have three lines to enable up to three kinds of synchronization processings to be executed in parallel, for example. The number of parallel processings is not particularly limited to "three".

The synchronization processing circuit according to the first mode of implementation includes as many input data control units 10 as the number of parallel processings, as many input data selection units 21 through 2N as the number of correlation operation modules, correlation operation modules 31 through 3N, as many correlation result data output selection units 90 as the number of parallel processings, and succeeding stage voltage addition unit 100, electric power calculation unit 110 and averaging processing unit 120.

Although not shown in the figure, an overall control unit is also included which executes processing assignment of the correlation operation module and following selection control of the input data selection unit and the correlation result data output selection unit and in some cases, a peak detection unit which detects a peak from correlation result data or other unit is included at the succeeding stage. Each module is connected to on-chip memories (RAM) 11, 101 and 121 as required.

In order to cope with various kinds of correlation codes whose code length is different, the first mode of implementation is based on a structure of an accumulative addition type sliding correlator which shifts (slides) a correlation code (Code) between adjacent correlators 60 by a shift register (delay element) 50 to receive input of common data as reception data as shown in FIG. 1 and FIG. 2.

Then, it is based on a layered parallel structure in which with a correlation operation module having a plurality (four, eight or the like) of correlators 60 mounted as one unit, for example, a plurality of the correlation operation modules (the correlation operation modules 31 through 3N) are mounted.

In order to enable common timing correlation processing by using a plurality of correlation operation modules, each of the correlation operation modules 31 through 3N is structured such that adjacent respective correlation operation modules 31 through 3N transmit and receive a shifted (slid) correlation code without change. Furthermore, for enabling the plurality of correlation operation modules to execute common code correlation processing as well, it is structured to individually receive input of an external correlation code and select a correction code received from an adjacent correlation operation module and the individually input correlation code.

More specifically, provided in each of the correlation operation modules 31 through 3N is a correlation code selection unit 40 which selects a correlation code input from an adjacent correlation operation module and an externally input correlation code. Further provided between modules is an interface for outputting a shifted (slid) correlation code to an adjacent correlation operation module.

For making a reception data signal (IQ input) to each of the correlation operation modules 31 through 3N be adapted to mapping to any of parallel processings, the input data selection units 21 through 2N are each provided for each correlation operation module such that any reception data signal from the reception data control unit 10 to be processed in parallel can be selected and input. In addition, for each of the correlation operation modules 31 through 3N, an input interface for inputting an individual correlation code is provided.

Each correlator 60 in the correlation operation modules 31 through 3N commonly uses, as a reception data signal, a one-system reception data signal (IQ Input) applied and uses, as a correlation code, a common correlation code which is selected by the correlation code selection unit 40 and shifted (slid) by a shift register (delay element) 50.

Since each correlator 60 in the correlation operation module is thus structured to use a common reception data signal and a common correlation code to prevent the need of provision of a code generation unit and a selection circuit for each correlator 60, each correlation operation module can be structured with relative ease and with less overhead in circuit scale.

As to output of each correlation result data from each of the correlation operation modules 31 through 3N to the succeeding stage modules such as the voltage addition unit 100, the electric power calculation unit 110 and the averaging processing unit 120, a correlation data output control unit 70 is provided in each of the correlation operation modules 31 through 3N for controlling output of correlation result data from each correlator 60. Provided outside the correlation operation modules 31 through 3N are as many correlation result data output selection units 90 as the number of parallel processings so as to output to any of the succeeding stage modules which execute parallel processing of the correlation result data from each of the correlation operation modules 31 through 3N.

(Operation of the First Mode of Implementation)

Description will be made of operation of the above-described first mode of implementation with reference to FIG. 1 through FIG. 7 in the following.

As basic operation of the synchronization processing according to the first mode of implementation, first, as shown in FIG. 1, execute correlation operation at each correlator 60 in each of the correlation operation modules 31 through 3N by using the reception data signal (IQ Input) from the input data control unit 10 and a correlation code (Code 1 through Code N) for the processing in question.

Then, with respect to the obtained correlation result data, the voltage addition unit 100 executes voltage addition processing (in-phase addition processing) of each of an I component and a Q component, the electric power calculation unit 110 calculates electric power and the averaging processing unit 120 executes averaging processing (electric power addition processing) as required.

The synchronization processing is realized by outputting correlation result data as of after averaging processing as a profile or storing the same in a memory to detect a peak by a CPU, DSP or a peak detection unit not shown.

Figure 3:
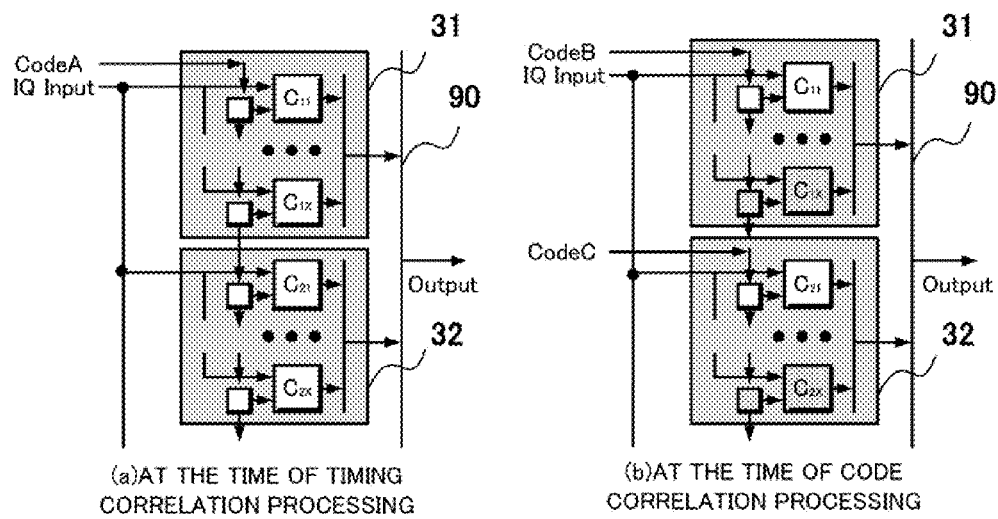
FIG. 3 is a diagram showing an operation image at the time of timing correlation processing and at the time of code correlation processing according to the first mode of implementation.

FIG. 3 is a diagram showing an example of an image of operation to be executed at the time of execution of (a) timing correlation processing and (b) code correlation processing by using the plurality of the correlation operation modules 31 through 3N shown in FIG. 1 and FIG. 2.

(a) When executing the timing correlation processing, as to data input to an assigned correlation operation module, the input data control units 21 through 2N are set so as to input a common reception data signal. The correlation code selection unit 40 in the assigned correlation operation module is set to select input of an external correlation code in question only in the leading correlation operation module and select a common correlation code input from an adjacent correlation operation module in the other correlation operation modules. Obtained as a result is such an operation image as shown in FIG. 3(*a*). Then, in each correlation operation module, shifting (sliding) a correlation code by the shift register (delay element) 50 to execute correlation operation processing by each correlator 60 enables timing correlation processing of common reception data and a common correlation code while staggering the correlation timing.

(b) Also when executing code correlation processing, as to input data to an assigned correlation operation module, the input data control units 21 through 2N are set to input a common reception data signal. On the other hand, the correlation code selection unit 40 in the assigned correlation operation module is each set to select an individual correlation code externally applied. Obtained as a result is such an operation image as shown in FIG. 3(*b*). Then, execution of the correlation operation processing by one correlator 60 in the correlation operation module by using the selected individual correlation code enables different code correlation processings with respect to a common reception data signal at the same timing.

Figure 4:
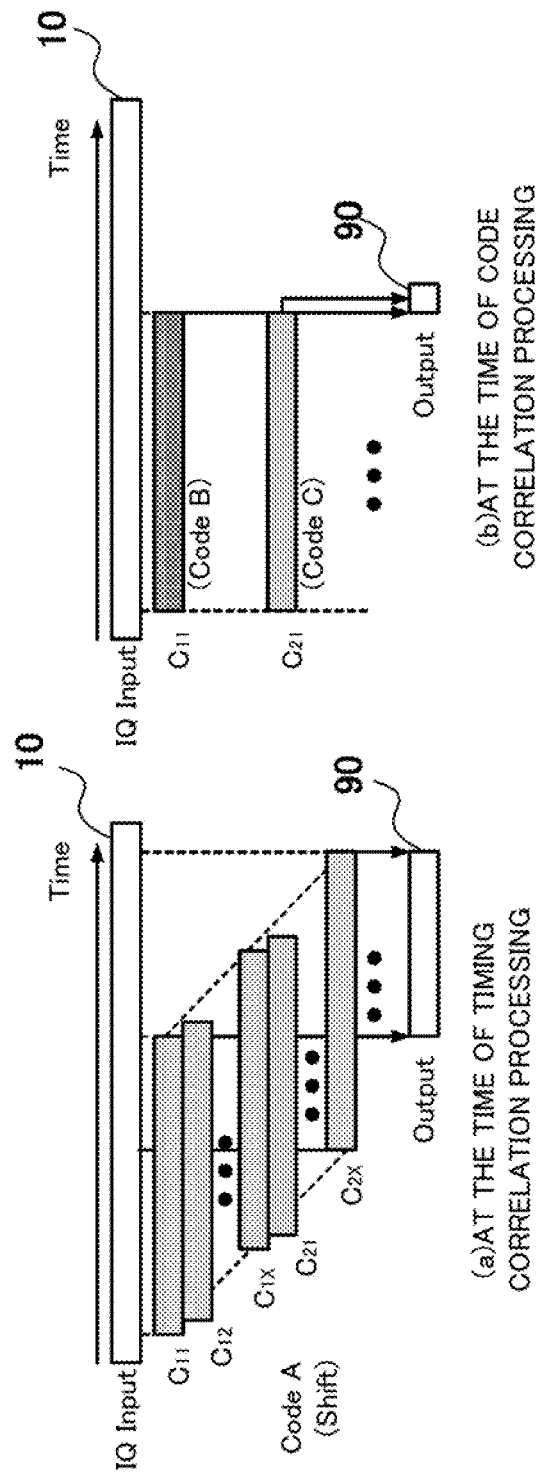
FIG. 4 is a diagram showing operation timing at the time of timing correlation processing and at the time of code correlation processing according to the first mode of implementation.

FIG. 4 is a diagram showing an example of operation timing in a case where (a) the timing correlation operation processing and (b) the code correlation processing are executed as shown in FIG. 3 by using the plurality of correlation operation modules 31 through 3N shown in FIG. 1 and FIG. 2.

The input data control unit 10 sequentially outputs the reception data signal (IQ Input) to an assigned correlation operation module on a sample basis.

(a) In a case of timing correlation processing, the assigned correlation operation module group executes correlation operation processing with respect to common reception data at different timing by using the same correlation code shifted between the respective correlators 60 and between the correlation operation modules 31 through 3N. Each correlator 60 starts operation at timing different from each other to sequentially output a correlation result at different timing. Here, the correlation data output control unit 70 in each correlation operation module sequentially selects and outputs correlation results of the correlators 60 starting at the correlator whose output timing is early. The correlation result data output selection unit 90 outside the correlation operation module also sequentially selects correlation results from the correlation operation modules starting at the module whose output timing is early and outputs the same to a succeeding module.

(b) In a case of code correlation operation processing, an individual correlation code is used in the assigned correlation operation module group and one correlator 60 in each correlation operation module executes the correlation operation processing with respect to common reception data at the same timing. The correlator 60 used starts operation at the same timing and outputs a correlation result at the same timing. The correlation data output control unit 70 in each correlation operation module accordingly selects and outputs only a correlation result of the correlator 60 used. The correlation result data output selection unit 90 outside the correlation operation module executes access arbitration of the respective correlation results output simultaneously, sequentially selects a correlation result from each of the correlation operation modules 31 through 3N and outputs the same to the succeeding module. Here, the correlation data output control unit 70 in each correlation operation module comprises an access control mechanism for waiting an output (Output) of a correlation result until an access can be accepted (ACK).

Control of the input data selection units 21 through 2N, the code selection unit 40 in the correlation operation module and the correlation result data output selection unit 90 is executed by setting a parameter by an overall control unit or the like. Generation of correlation codes (Code 1 through Code N) to be used by each of the correlation operation modules 31 through 3N can be realized by a flexible random sequence generator capable of coping with various kinds of code sequences by parameter setting or a code storage circuit which stores a correlation code in a memory or the like in advance and sequentially reads the correlation code from the memory.

(Description of Operation in Code Correlation Processing at Neighborhood Timing)

In cell search processing, a method is in some cases employed which is called multistage cell search of detecting reception timing by the timing correlation processing at the first stage and detecting a base station code by the code correlation processing at the detected reception timing at the second and the following stages. Known here as a method to increase precision of cell search processing is executing code correlation processing at the time of the second and following stage code correlation processing at neighborhood timing (a plurality of successive reception timings) staggered by ±one sample or ±two samples from reception timing; detected at the first stage and simultaneously executing fine adjustment of reception timing and code detection.

Figure 5:
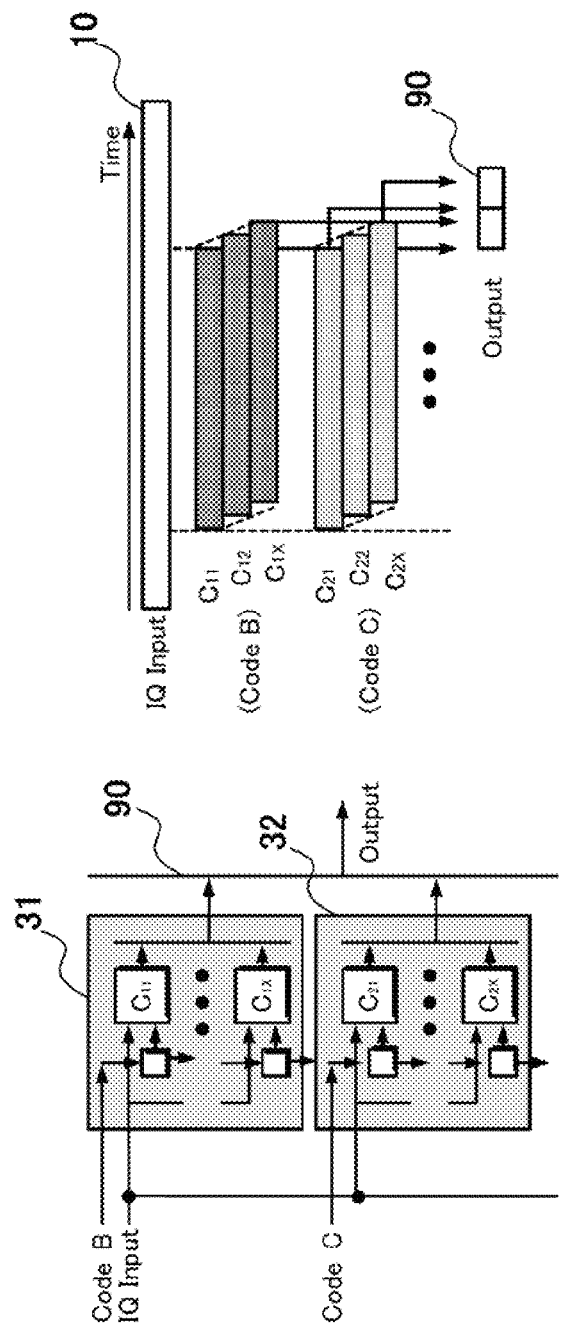
FIG. 5 is a diagram showing an operation image at the time of code correlation processing including neighborhood timing according to the first mode of implementation.

FIG. 5 is a diagram showing examples of (c1) operation image and (c2) operation timing in a case where code correlation processing is executed at neighborhood timing by using the synchronization processing circuit according to the first mode of implementation shown in FIG. 1 and FIG. 2.

In this case, the correlation code selection unit 40 in the assigned correlation operation module is set to select an individual correlation code externally applied and the correlation code is shifted (slid) by the shift register (delay element) 50 in each correlation operation module to execute correlation operation processing at each correlator 60. As a result, correlation operation processing is realized by using different codes among the correlation operation modules 31 through 3N and using the same correlation code at staggered correlation timing in each correlation operation module, resulting in enabling code correlation processing at neighborhood timing ((c1) in FIG. 5).

Since as output of a correlation result, correlation results at neighborhood timing are sequentially output from the assigned correlation operation module by using different correlation codes, the correlation result data output selection unit 90 outside the correlation operation module executes access arbitration of the respective correlation results sequentially output at the same time, selects correlation results in order from the respective correlation operation modules and outputs the same to the succeeding module ((c2) in FIG. 5). Therefore, the correlation data output control unit 70 (FIG. 2) in each correlation operation module comprises an access control mechanism for waiting an output (Output) of a correlation result until an access can be accepted (ACK).

(Description of the Number of Correlation Operation Modules Assigned and Operation Timing)

Figure 6:
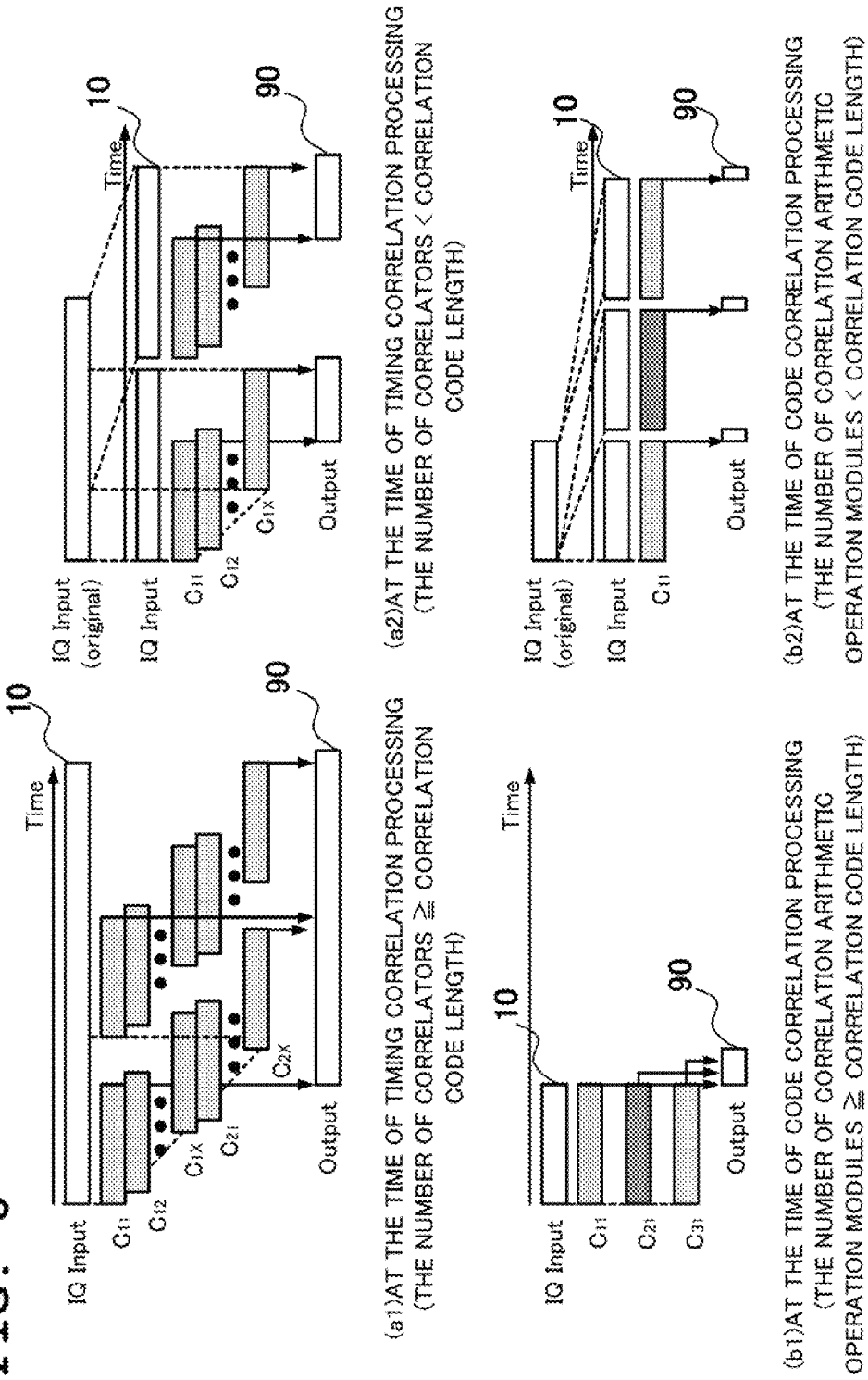
FIG. 6 is a diagram showing a relationship between the number of correlators assigned to processing and operation timing according to the first mode of implementation.

FIG. 6 is a diagram showing a relationship between the number of assigned correlation operation modules and correlation processing operation timing.

One operation time of each correlator 60 is determined by a correlation code length to be used. In a case of (a) timing correlation processing, accordingly, when the number of correlation operation modules is assigned such that the total number of correlators 60 in each correlation operation module is larger than a correlation code length as shown in FIG. 6(a1), it is only necessary to output one reception data signal from the input data control unit 10 for each sample. At this time, a correlator having finished correlation processing for one time of correlation codes will be used again at timing subsequent to the end of the processing corresponding to the total number of correlators (the number of parallel correlators).

On the other hand, when the total number of the correlators 60 in the assigned correlation operation module is smaller than the correlation code length as shown in FIG. 6(a2), it is only necessary to again output a reception data signal required for subsequent correlation operation from the input data control unit 10 at a time point where as many correlation results as the total number of the correlators 60 (the number of parallel correlators) are obtained.

In a case of (b) the code correlation processing, when the number of the correlation operation modules is assigned such that the number of assigned correlation operation modules is larger than the number of correlation codes as shown in FIG. 6(b1), it is only necessary to output one reception data signal equivalent to a correlation code length from the input data control unit 10 for each sample.

On the other hand, when the number of the assigned correlation operation modules is smaller than the number of correlation codes as shown in FIG. 6(b2), it is only necessary to again output a reception data signal required for executing processing corresponding to a subsequent correlation code from the input data control unit 10 at a time point where each correlation result is obtained. Accordingly, the input data control unit 10 is structured to cope with all the above-described cases shown in FIG. 6 by comprising such a mechanism as a memory address generation circuit for repeatedly reading an input data signal (IQ Input) with an offset attached from the input data storage memory 11 and outputting the same to each of the correlation operation modules 31 through 3N.

(Description of Parallel Operation of a Plurality of Synchronization Processings)

Figure 7:
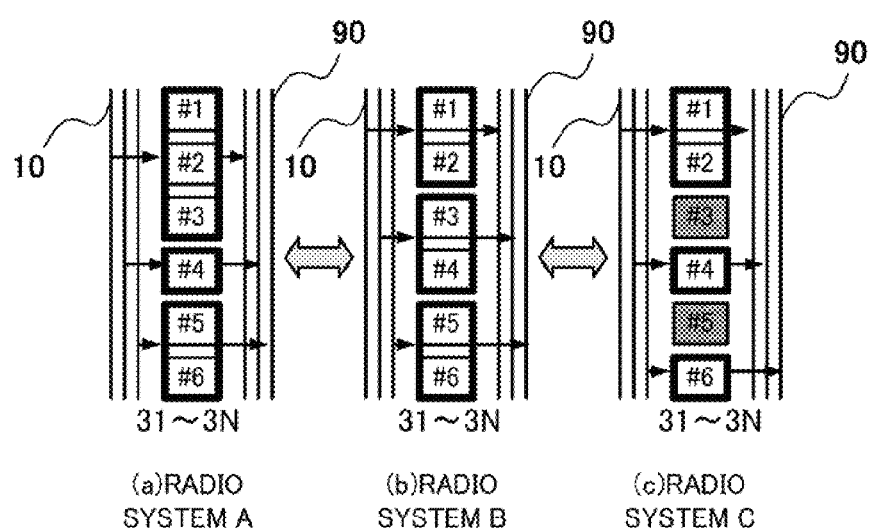
FIG. 7 is a diagram showing examples of processing mapping change of a synchronization processing circuit in a plurality of radio systems according to the first mode of implementation.

FIG. 7 is a diagram showing an operation image example in a case where a plurality of synchronization processings such as the first and second stages of the cell search processing and the path search processing are executed in parallel by using the synchronization processing circuit shown in FIG. 1 and FIG. 2.

In the first mode of implementation of the present invention shown in FIG. 1, while the correlation operation module units 31 through 3N have a layered parallel structure, the other input data control unit 10, correlation result data output selection unit 90, succeeding voltage addition unit 100, electric power calculation unit 110 and averaging processing unit 120 are basically arranged in parallel as many as the number of synchronization processings to be executed in parallel. Although in the present exemplary embodiment, the number of units arranged in parallel is not in particular limited to "3", description will be made of a case of three in parallel in FIG. 7 because FIG. 1 also shows the structure example of three in parallel. In this case, the number of the correlation operation modules 31 through 3N is six.

In the present exemplary embodiment, by controlling the input data selection units 21 through 2N, the correlation code selection unit 40 in each correlation operation module, and the correlation result data output selection unit 90, it is possible to arbitrarily change to which synchronization processing to be executed in parallel, each correlation operation module should be assigned, thereby enabling restructuring of the entire synchronization processing circuit.

Here, when a plurality of correlation operation modules are assigned to common timing correlation processing, for the correlation code selection unit 40 to select a correlation code input from an adjacent correlation operation module, a plurality of adjacent correlation operation modules are assigned. Then, the input data selection units 21 through 2N of the respective correlation operation modules 31 through 3N execute selection setting to input a reception data signal (IQ Input) of assigned processing. The correlation result data output selection unit 90 executes selection setting to output only a correlation result from a correlation operation module assigned to the processing in question to a succeeding module.

Thus, by providing the present invention with relatively simple selection circuits 21 through 2N and 90 to execute selection setting only for them, the number of the correlation operation modules 31 through 3N assigned to a plurality of synchronization processings to be executed in parallel can be arbitrarily changed as shown in FIG. 7.

(First Exemplary Embodiment)

Figure 8:
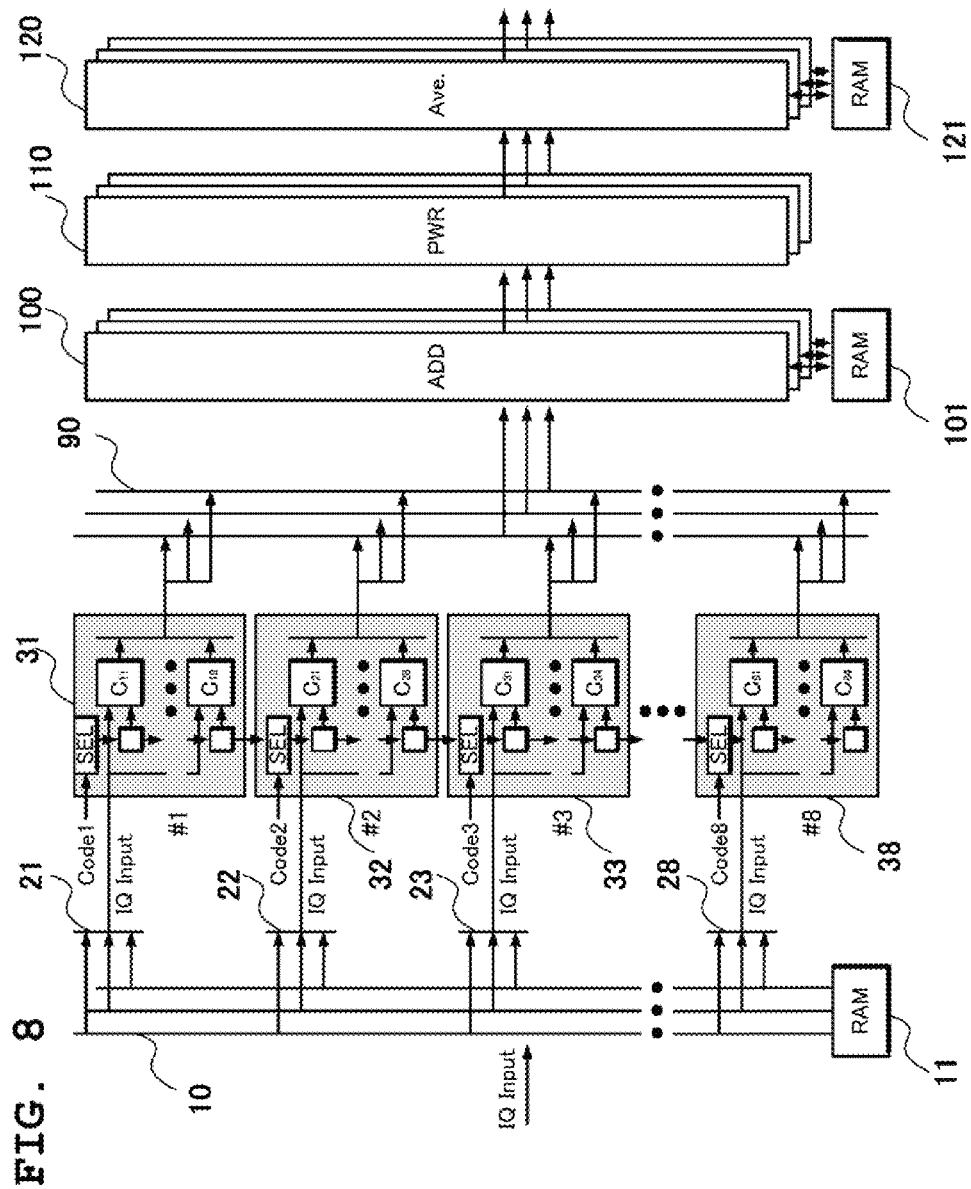
FIG. 8 is a block diagram showing an entire structure of a synchronization processing circuit according to a first exemplary embodiment of the present invention.

FIG. 8 is a diagram showing an exemplary embodiment of a synchronization processing circuit in a case where the first mode of implementation is applied, as one specific example, to a wireless communication processing system capable of coping with both a W-CDMA (Wideband Code Division Multiple Access) radio system standardized by 3GPP (3rd Generation Partnership Project) and an LTE (Long Term Evolution) radio system.

(Description of Structure)

FIG. 8 shows an exemplary embodiment in a case where the entire synchronization processing circuit is parallelized to have three lines to enable up to three kinds of synchronization processings to be executed in parallel and eight correlation operation modules (codes 31 to 38) are mounted in both the systems.

The first exemplary embodiment is formed of as many input data control units 10 as three parallel processings, eight input data selection units 21 through 28 which are as many as correlation operation modules, correlation operation modules 31 through 38, as many correlation result data output selection units 90 as the number of parallel processings, and succeeding stage voltage addition unit 100, electric power calculation unit 110 and averaging processing unit 120, and the like. An internal structure of each of the correlation operation modules 31 through 38 is the same as that shown in FIG. 2.

Figure 9:
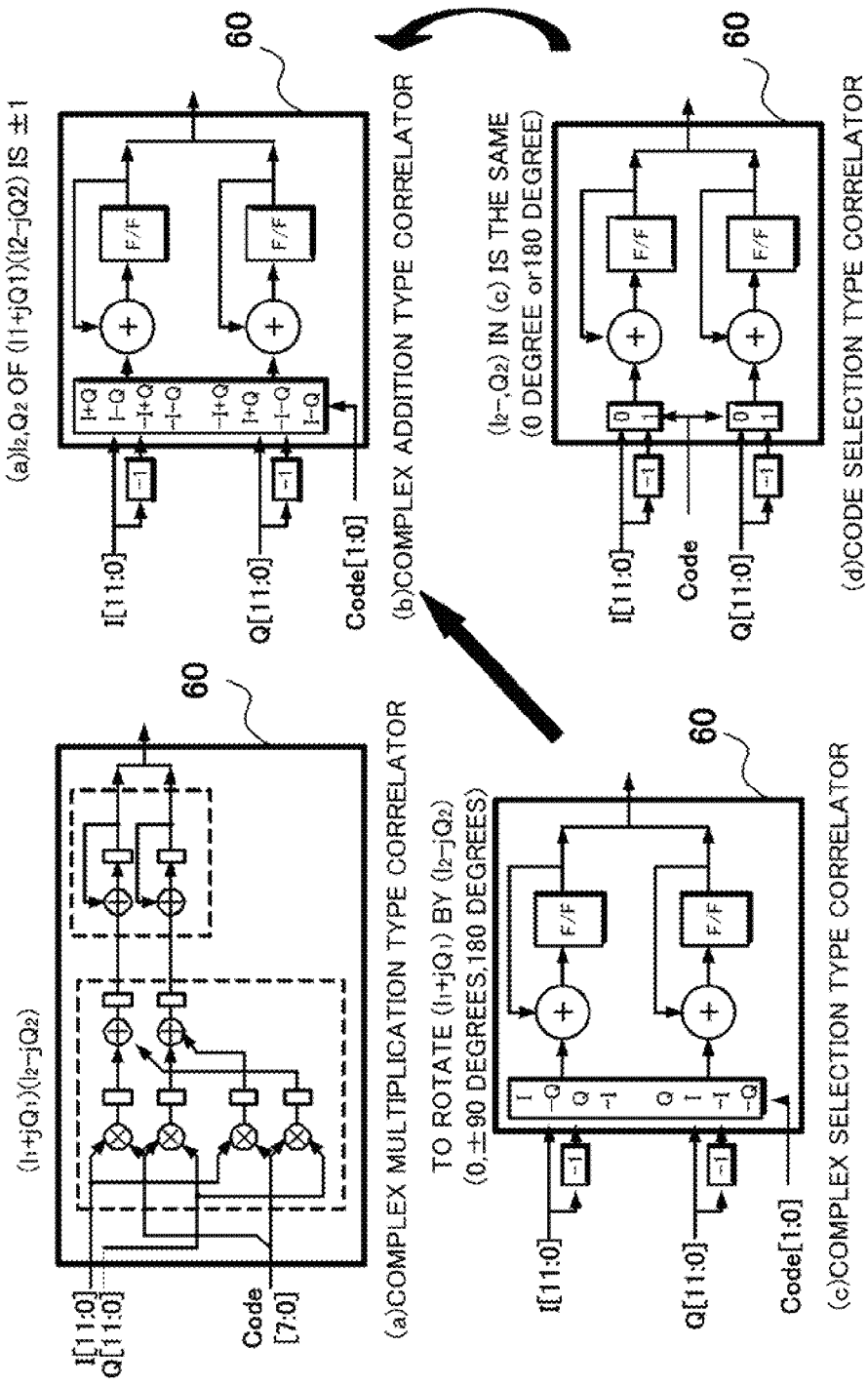
FIG. 9 is a block diagram showing a structure of each correlator according to the first exemplary embodiment of the present invention.

FIG. 9 is a diagram showing an example of a structure of each correlator 60 mounted in each correlation operation module. Mainly used in the LTE system are such a common complex multiplication type correlator as shown in FIG. 9(a), such a complex addition type correlator limited to a case where a correlation code has two values of ±1 as shown in FIG. 9(b) and the like.

Used in the W-CDMA system are such a correlator whose correlation code has two values of ±1 and which has an IQ signal as reception data rotate on a complex plane as shown in FIG. 9(c), such a code selection type correlator as shown in FIG. 9(d) limited to a case where the correlation code value shown in FIG. 9(c) is the same for I and Q, and the like.

Assume here in the first exemplary embodiment that two specific correlation operation modules (31 and 32 in FIG. 8) each comprise eight complex multiplication type correlators 60 shown in FIG. 9(a) and the remaining six correlation operation modules (codes 33 through 38 in FIG. 8) each comprise four complex addition type correlators 60 shown in FIG. 9(b).

The complex addition type correlator 60 shown in FIG. 9(b) realizes with ease the functions of the complex selection type and code selection type correlators shown in FIG. 9(c) and FIG. 9(d) by mode setting. This has an advantage that use efficiency and flexibility of a correlator is improved while suppressing circuit scale impact by mounting the minimum necessary number of complex multiplication type correlators whose circuit scale impact is large and mounting a sharable complex addition type correlator as the other correlators 60 which have a small difference in circuit scale impact.

(Description of Operation)

Figure 10:
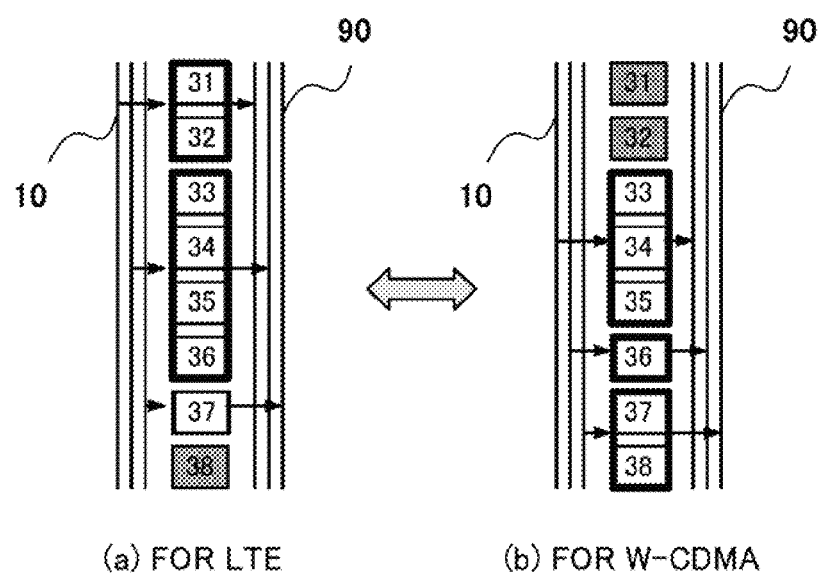
FIG. 10 is a diagram showing a processing mapping change among a plurality of radio systems according to the first exemplary embodiment of the present invention.

FIG. 10 is a diagram showing operation images of the synchronization processing circuit according to the first exemplary embodiment of the present invention shown in FIG. 8 in a case of (a) the LTE radio system and (b) the W-CDMA radio system.

Determine the number of the correlation operation modules 31 through 38 to be mounted and assignment of processing based on an operation clock frequency of the synchronization processing circuit and required processing performance of each synchronization processing.

(a) When operating the circuit as the LTE radio system, it is structured to enable three parallel processings, the first stage of the cell search processing, the second stage of the cell search processing and the path search processing. Since a complex multiplication type correlator is here required only at the first stage of the cell search processing, two correlation operation modules, 31 and 32 are assigned. Executed, for example, is timing correlation processing as the first stage of the cell search processing by using, for example, 2×8=16 complex multiplication type correlators 60.

At the second stage of the cell search processing, code correlation processing is executed by using, for example, four correlation operation modules whose reference numbers are 33 through 36. The processing is here executed by using four correlators 60 when the code correlation processing is executed only with respect to reception timing detected at the first stage and using the maximum of 4×4=16 correlators 60 when the code correlation processing is executed including neighborhood timing. Similarly, to the path search processing, one correlation operation module whose reference number is 37, for example, is assigned.

(b) In a case of the W-CDMA radio system, it is structured to enable three parallel processings, the first stage of the cell search processing, the second stage and a third stage of the cell search processing and the path search processing. The second stage and the third stage of the cell search processing here are realized by sharing the circuit and executing the processing of the third stage by using the same circuit after the processing of the second stage is completed.

In a case of the W-CDMA radio system, since use of a complex multiplication type correlator is not required, the timing correlation processing is executed by assigning, for example, three correlation operation modules whose reference numbers are 33 through 35 at the first stage of the cell search processing and using 3×4=12 correlators 60. When one or neighborhood timing is processed by assigning, for example, one correlation operation module whose reference number is 36 to the second and third stages of the cell search processing, the second and third stages of the code correlation processing is executed by using the maximum of 1×4=4 correlators 60. Similarly, for example, two correlation operation modules whose reference numbers are 37 and 38 are assigned to the path search processing to execute the timing correlation processing by using 2×4=8 correlators 60.

(Description of Correlation Code Generation Method)

Figure 11:
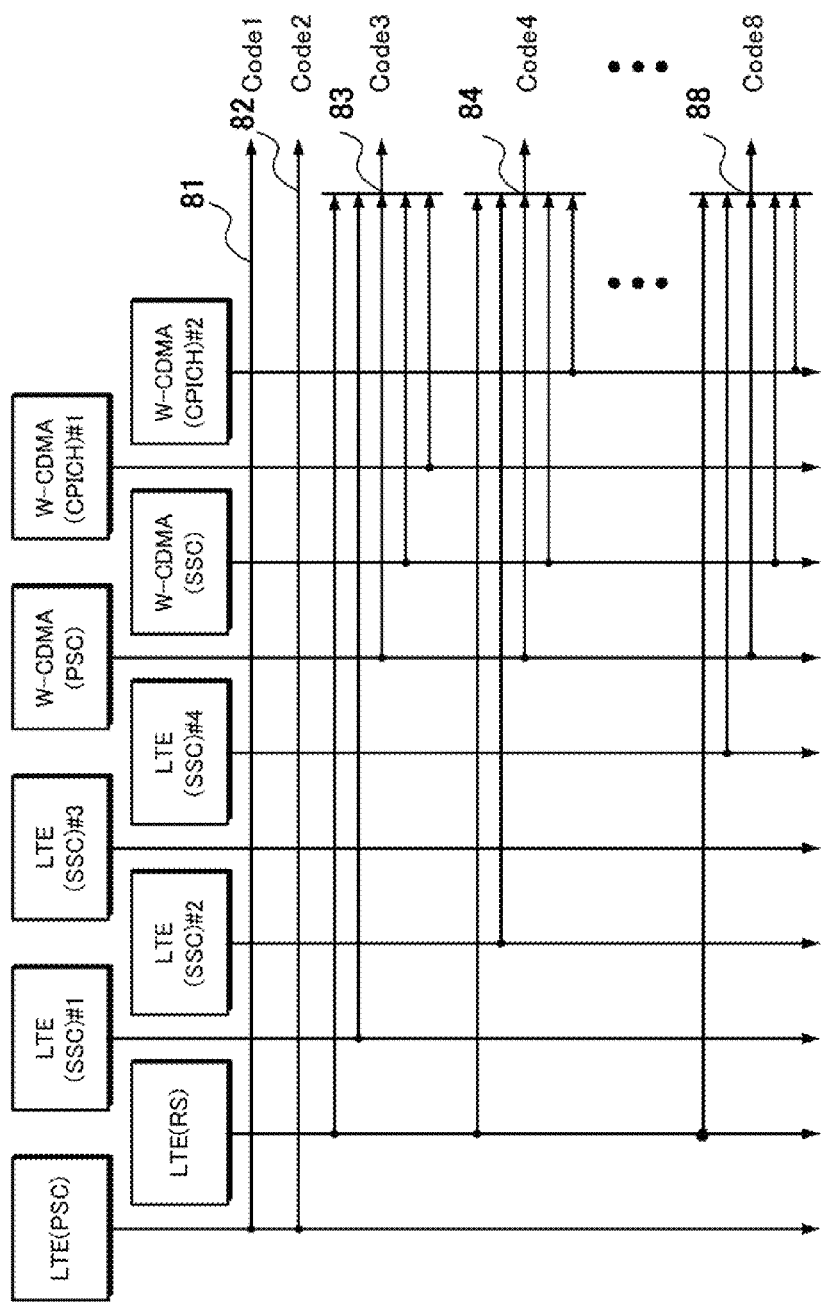
FIG. 11 is a diagram showing a connection structure of a correlation code generation unit according to the first exemplary embodiment of the present invention.

FIG. 11 is a diagram showing an example of a structure of correlation code generation units for Code 1 through Code 8 in the synchronization processing circuit according to the first exemplary embodiment shown in FIG. 8. In the first exemplary embodiment of the present invention, as many correlation code generation circuits as required for synchronization processing to be executed in parallel are mounted and correlation code input to each correlation operation module is realized by comprising correlation code input selection units 81 through 88 capable of selecting correlation codes corresponding to assigned synchronization processing.

Each correlation code generation circuit can be realized by a random sequence generation circuit capable of generating various kinds of correlation codes by parameter setting or by a read only memory (ROM) without any problem. In a case of a random sequence generation circuit, each generation unit shares the circuit such that the same circuit generates a plurality of codes.

Also possible as a method of generating a correlation code a little different from that shown in FIG. 11 involving no problem is a method in which, with a correlation code memory mounted for each of the correlation codes (Code 1 through Code 8), at a stage where assignment of a correlation operation module to processing is determined in each radio system, a value of a corresponding correlation code is written and read to generate a correlation code. In this case, none of the correlation code input selection units 81 through 88 shown in FIG. 11 is required.

In any case, the present exemplary embodiment requires none of correlation code generation circuits to be mounted for each correlator 60 and each of the correlation operation modules 31 through 3N and can be realized by generating as many correlation codes as required for parallel processing in each radio system.

(Effects of the First Mode of Implementation)

In the following, effects obtained by the present mode of implementation will be described.

First effect is that in a synchronization processing circuit in a wireless communication system, timing correlation processing of executing correlation operation by the same correlation code at different reception timing and code correlation processing of executing correlation operation by using a different correlation code at the same reception timing can be coped with efficiently by the same synchronization processing circuit.

The reason is that the present mode of implementation has a layered parallel structure in which based on the structure of a sliding correlator that shifts (slides) a correlation code by using a shift register and with the correlation operation modules 31 through 3N having a plurality of, four or eight correlators 60 mounted as one unit, a plurality of such correlation operation modules are mounted, and a structure in which a correlation code shifted (slid) at an adjacent arithmetic operation module is transmitted and received without change and the code and an externally applied correlation code are selectively input.

The present structure enables the timing correlation processing to be coped with out the need of generation of a correlation code for each of the correlators 60 or the correlation operation modules 31 through 3N by inputting, only to a leading correlation operation module, an external correlation code in question and to each of the other correlation operation modules, selectively using a correlation code shifted and transferred from its adjacent correlation operation module to execute correlation operation while staggering operation timing for each correlator. The code correlation processing can be coped with by selecting and using an externally applied individual correlation code by an assigned correlation operation module to use a specific correlator 60 in each correlation operation module, thereby executing correlation operation at the same timing between the correlation operation modules.

Another advantage is, as shown in FIG. 5, that code correlation processing including neighborhood timing such as ±1 sample can be coped with by the present circuit structure without change by using an externally applied individual correlation code between the correlation operation modules 31 through 3N and in each correlation operation module, operating each correlator 60 with a correlation code in question shifted (slid) while staggering operation timing similarly to the timing correlation operation.

The present exemplary embodiment here has an advantage that structuring each of the correlation operation modules 31 through 3N by a plurality of correlators 60 in the lump and mounting only one correlation code selection unit 40 to be added results in having a smaller circuit scale overhead than that of a structure which requires a correlation code selection circuit for each correlator 60. As a result, a circuit overhead on a synchronization processing circuit dedicated for timing correlation processing or code correlation processing is relatively small as well. In addition, while mounting a plurality of code generation circuits for each correlator will have a large overhead in circuit scale, it is only necessary to mount as many code generation circuits as required for parallel processing, which enables high flexibility to be realized extremely efficiently with less overhead.

Second effect is that when in a synchronization processing circuit in a wireless communication system, executing each synchronization processing in parallel, the number of correlation operation modules to be assigned to each processing can be arbitrarily changed.

The reason is that in the present exemplary embodiment, the input data selection units 21 through 2N are each provided for each correlation operation module such that a reception data signal (IQ Input) from any of the input data control units 10 which are to be processed in parallel is applied to each of the correlation operation modules 31 through 3N and the correlation result data output selection unit 90 is provided which outputs only necessary correlation result data to a succeeding stage such that each correlation result data is also output to any of the succeeding modules.

Moreover, each of the correlation operation modules 31 through 3N is provided with an access control function of waiting output (Output) of a correlation result until the correlation data output control unit 70 becomes ready for accepting an access (ACK) even when output of correlation result data is waited.

Combination of the structure recited in the first effect and the structure described above allows parallel execution of the respective synchronization processings to be efficiently coped with such as the first stage (timing correlation processing) and the second stage (code correlation processing) of the cell search processing and the path search processing (timing correlation processing) and furthermore enables the number of correlation operation modules to be assigned to each synchronization processing to be arbitrarily changed. This produces an advantage that speed-up enabled by parallel processing and efficient load distribution enabled by a variable number of processings to be assigned can be realized at the same time.

A further advantage is that parallel processing is enabled with relative ease because other components than the input data selection units 21 through 2N, the respective correlation operation modules 31 through 3N and the correlation result data output selection unit 90 can be realized simply by parallelizing those to be processed in parallel.

Third effect is enabling, in a synchronization processing circuit in a wireless communication system, the same synchronization processing circuit to cope with various synchronization processings in a plurality of radio systems by sharing the circuit and enabling circuit restructuring with ease by selection setting.

The reason is that while contents and correlation codes of each synchronization processing in various radio systems in general largely differ depending on the radio system used, it is highly possible that processing contents can be realized by either timing correlation processing or code correlation processing in the present mode of implementation or a combination thereof.

Here, the present mode of implementation has an advantage of coping with both the timing correlation processing and the code correlation processing efficiently first because of a layered parallel structure in which with the correlation operation modules 31 through 3N mounted with a plurality of the correlators 60 as one unit, a plurality of such correlation operation modules are mounted as shown in the first effect and because of a structure in which a correlation code received from an adjacent correlation operation module and an externally applied correlation code are selectively input.

In addition, as shown in the second effect, to which synchronization processing each correlation operation module should be assigned, mapping of the same can be arbitrarily changed. Accordingly, using the synchronization processing circuit according to the present exemplary embodiment and mounting such a correlation code generation unit capable of coping with each radio system as shown in the first exemplary embodiment to change assignment of each correlation operation module to processing in each radio system as shown in FIG. 10 enables synchronization processings in a plurality of radio systems to be efficiently coped with.

As a result, as compared with a case where an individual dedicated synchronization processing circuit is mounted in each radio system, circuit scale can be drastically reduced. Here, since required processing performance is expected to largely differ with synchronization processing of each radio system, it has a great advantage in terms of efficient load distribution in a plurality of radio systems that the number of correlation operation modules to be assigned to each processing is changeable. Also as to a structure of the correlator 60 in the correlation operation module, mounting a minimum required number of complex multiplication type correlators each of which is capable of coping with all but has a large circuit scale and mounting, in the remaining correlation operation modules, a complex addition type correlator which is capable of coping with all the cases where a correlation code is binary enables more radio systems to be coped with flexibly while suppressing circuit scale overhead.

(Second Mode of Implementation)

Figure 12:
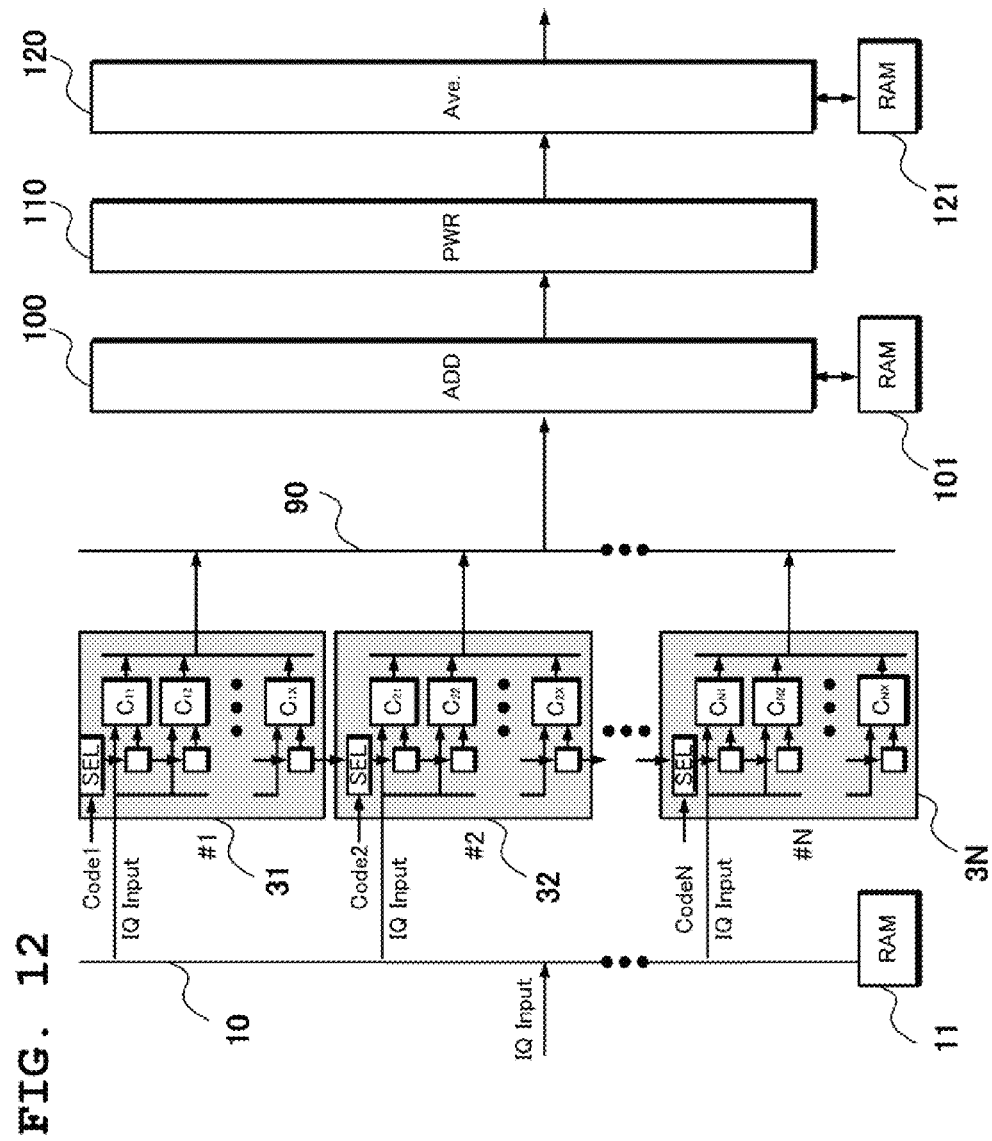
FIG. 12 is a block diagram showing an entire structure of a synchronization processing circuit according to a second mode of implementation of the present invention.

FIG. 12 is a block diagram showing an example of a structure of a synchronization processing circuit when parallel processing of a plurality of synchronization processings is not required in particular according to a second mode of implementation.

Similarly to the first mode of implementation, a wireless communication system according to the present mode of implementation comprises a synchronization processing circuit having a layered parallel structure in which with a correlation operation module having a plurality, four or eight, for example, of correlators as one unit, a plurality (N in the example shown in FIG. 12) of such correlation operation modules are mounted.

While shown in the first mode of implementation is a case, as an example, where the entire synchronization processing circuit is parallelized to have three lines so as to execute up to three kinds of synchronization processings in parallel, shown in the second mode of implementation will be a case where it is unnecessary in particular to execute a plurality of synchronization processings in parallel. Accordingly, provided are one input data control unit 10, the correlation operation modules 31 through 3N, one correlation result data output selection unit 90, and the voltage addition unit 100, the electric power calculation unit 110 and the averaging processing unit 120 at the succeeding stages, and the like.

Also included, although not shown in the figure, is a control unit which controls the entire circuit in order to execute assignment of a correlation operation module to processing and following selection control of the input data selection unit and the correlation result data output selection unit. In some cases, a peak detection unit might be included. Each module is connected to the on-chip memory (RAM) 11 as required. The second mode of implementation here requires none of as many input data selection units 21 through 2N as the number of correlation operation modules which are necessary in the first mode of implementation.

Figure 13:
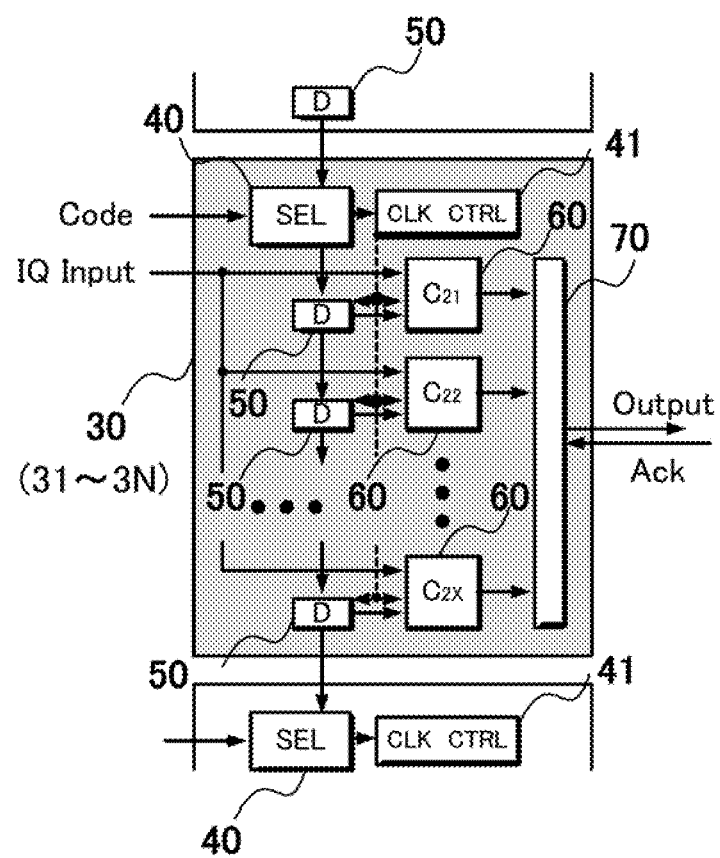
FIG. 13 is a block diagram showing a structure of a correlation operation module according to the second mode of implementation of the present invention.

FIG. 13 is a diagram showing an example of a structure of each of the correlation operation modules 31 through 3N in the second mode of implementation. Similarly to the first mode of implementation, the present mode is based on a structure of an accumulative addition type sliding correlator which shifts (slides) a correlation code (Code) by the shift register (delay element) 50 between the adjacent correlators 60 and receives input of common data as reception data. Besides, it is also the same as the first mode of implementation in having a layered parallel structure and comprising the correlation code selection unit 40 which selects a correlation code input from an adjacent correlation operation module for coping with the timing correlation processing and a correlation code externally input for coping with the code correlation processing.

The structure of the second mode of implementation shown in FIG. 13 is characterized in comprising a clock control unit 41 in each of the correlation operation modules 31 through 3N. The clock control unit 41 has a function of individually executing gating control of an operation clock for each correlator 60 and each shift register (delay element) 50 in the correlation operation module based on external setting at the time of assigning a correlation operation module to processing, as indicated by a dotted line in FIG. 13. The correlation operation modules 31 through 3N each comprising the clock control unit 41 are as a matter of course applicable to the first mode of implementation and the first exemplary embodiment shown in FIG. 1 and FIG. 8, respectively.

(Operation of the Second Mode of Implementation)

Operation in the second mode of implementation of the present invention is basically the same as that of the first mode of implementation shown in FIG. 3 through FIG. 6. More specifically, changing assignment of each correlation operation module to processing enables (a) timing correlation processing, (b) code correlation processing and (c) code correlation processing at neighborhood timing to be coped with.

Operation of the second mode of implementation is here characterized in that because of a structure failing to take parallel processing of a plurality of synchronization processings into consideration, setting of the input data selection units 21 through 2N shown in FIG. 1 is unnecessary to realize simplification of output of an input data signal (IQ Input) commonly to all the correlation operation modules 31 through 3N.

When executing a plurality of synchronization processings by using the synchronization processing circuit according to the second mode of implementation, different synchronization processings are realized by time-divisional manner (serial processing). More specifically, after certain synchronization processing is completed, the synchronization processing circuit is restructured to execute subsequent synchronization processing by changing each correlation code (Code 1 through Code 8) externally applied and a reception data signal (IQ Input) from the input data control unit 10 and setting of the correlation code selection unit 40 in each of the correlation operation modules 31 through 3N.

More specifically, possible as an example is executing, after the first stage (timing correlation processing) of the cell search processing, the second stage (code correlation processing) of the cell search processing and then the path search processing. Here, the number of correlation operation modules to be assigned to certain synchronization processing can be arbitrarily changed depending on required performance of each synchronization processing. As to the correlation operation modules 31 through 3N yet to be used, setting to the effect at the clock control unit 41 in the correlation operation module in question enables an operation clock to each correlator 60 and each shift register 50 in the correlation operation module to be all stopped.

Also in a case such as code correlation processing at certain one timing where only a part of a plurality of the correlators 60 in a correlation operation module to which processing is assigned is required but not all of them is required, setting which correlator 60 should be used at the clock control unit 41 enables operation clocks to be individually stopped for the correlator 60 and the shift register 50 yet to be used in each of the correlation operation modules 31 through 3N. This has a great advantage in terms of lower power consumption of the synchronization processing circuit. The correlation operation modules 31 through 3N each comprising the clock control unit 41 is also applicable to the first mode of implementation and the first exemplary embodiment as shown in FIG. 1 and FIG. 8.

(Effects of the Second Mode of Implementation)

According to the second mode of implementation, in addition to the above-described effect of the first mode of implementation, it is possible to stop an operation clock for a correlation operation module, a correlator and the like yet to be used in each radio system by controlling the clock control unit 41, thereby realizing lower power consumption efficiently.

Figure 14:
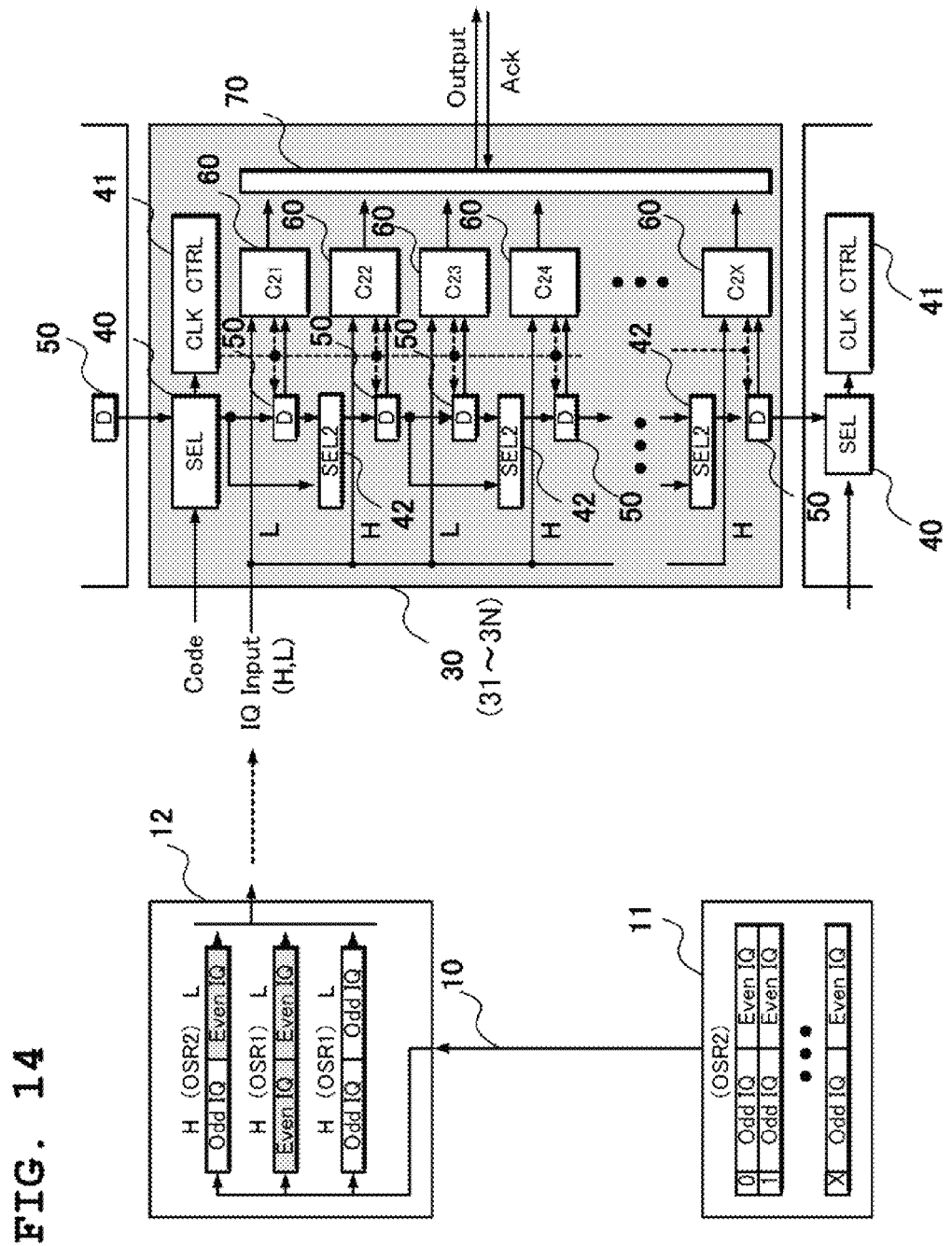
FIG. 14 is a block diagram showing a structure of a correlation operation module according to a third mode of implementation of the present invention.

More specifically, as shown in FIG. 13 or FIG. 14, lower power consumption which requires none of wasteful consumption of electric power can be efficiently realized by providing the function of stopping an operation clock for all the shift registers (delay element) 50 or correlators 60 in a correlation operation module yet to be used by means of the clock control unit 41 in the correlation operation module and when a part of the correlators 60 is used, individually stopping only an operation clock for the shift register (delay element) 50 or the correlator yet to be used.

(Third Mode of Implementation)

FIG. 14 is a block diagram showing an example of a structure according to a third mode of implementation of the present invention when the internal part of each correlation operation module is parallelized for coping with speed-up of oversampling processing.

Basic structure of the synchronization processing circuit according to the third mode of implementation of the present invention is the same as those of the first and second modes of implementation as shown in FIG. 1 and FIG. 12, respectively.

Structure characteristic of the third mode of implementation is enabling reception data signals (IQ Input) to each of the correlation operation modules 31 through 3N to be input as two samples in parallel (IQ Input (H,L)) as shown in FIG. 14 in order to cope with parallelization of, for example, double oversampling processing.

Then, it is structured that to each correlator 60 in each of the correlation operation modules 31 through 3N, a reception data signal (IQ Input (L)) on the lower side (L) is connected to an odd-numbered correlator and a reception data signal (IQ Input (H)) on the higher side (H) is connected to an even-numbered correlator.

As to a correlation code, provided is an oversampling processing correlation code selector 42 at an input of an even-numbered shift register (delay element) 50 such that the same correlation code can be latched at odd-numbered and even-numbered shift registers (delay element) 50. The oversampling processing correlation code selector 42 has a function of selecting an output from an immediately preceding odd-numbered shift register (delay element) 50 and an output of the last but one preceding even-numbered shift register (delay element) 50 (or an output of the correlation code selection unit 40).

Another characteristic structure of the third mode of implementation includes the input data control unit 10 and the input data storage memory 11. For coping with parallelization of, for example, double oversampling processing, the input data storage memory 11 is structured to store, at one address, two samples or more than two samples of reception data signals (IQ Input) sampled at the double oversampling rate (OSR).

When two samples each are stored here, reading only a higher side (Odd IQ) or a lower side (Even IQ) of each address leads to acquisition of a reception data signal not subjected to ordinary oversampling. In addition, the input data control unit 10 comprises a data shaping unit 12 which shapes two samples or more than two samples of reception data signals read from the input data storage memory 11 according to a processing rate of the synchronization processing.

The data shaping unit 12 has a function of selecting, by setting, two samples (Odd IQ and Even IQ) to be assigned to the higher side (H) and the lower side (L), respectively, without change, two samples of only the lower side (Even IQ) to be constantly assigned to both the higher side (H) and the lower side (L), and two samples of only the higher side (Odd IQ) to be constantly assigned to both the higher side (H) and the lower side (L) and outputting the same.

(Operation of the Third Mode of Implementation)

Description will be made of characteristic operation of the third mode of implementation of the present invention with reference to FIG. 14 and FIG. 15.

Characteristic operation of the third mode of implementation of the present invention is enabling correlation operation to be executed two samples each in parallel in a case of timing correlation processing at a double oversampling rate (OSR2) or code correlation processing including neighborhood timing at the double oversampling rate (OSR2).

When processing two samples each in parallel in the correlation processing at the double oversampling rate (OSR2), with respect to two samples or more than two samples of the reception data signals read from the input data storage memory 11, the input data control unit 10 assigns (OSR2) two samples (Odd IQ and Even IQ) of reception data signals (IQ Input) to the higher side (H) and the lower side (L) without change and outputs the same by means of the data shaping unit 12.

In addition, in each of the correlation operation modules 31 through 3N, the oversampling processing correlation code selector 42 is set to select an output of the last but two preceding even-numbered shift register (delay element) 50 (or an output of the correlation code selection unit 40) such that correlation codes to be input to two adjacent odd-numbered and even-numbered correlators 60 are constantly the same. Then, by operating the two adjacent odd-numbered and even-numbered correlators at the same timing, correlation operation of two samples of reception data signals (IQ Input (H, L)) can be executed in parallel. It is further possible to stop an operation clock of the correlator 60 or the shift register (delay element) 50 not in use by means of the clock control unit 41 as required.

Figure 15:
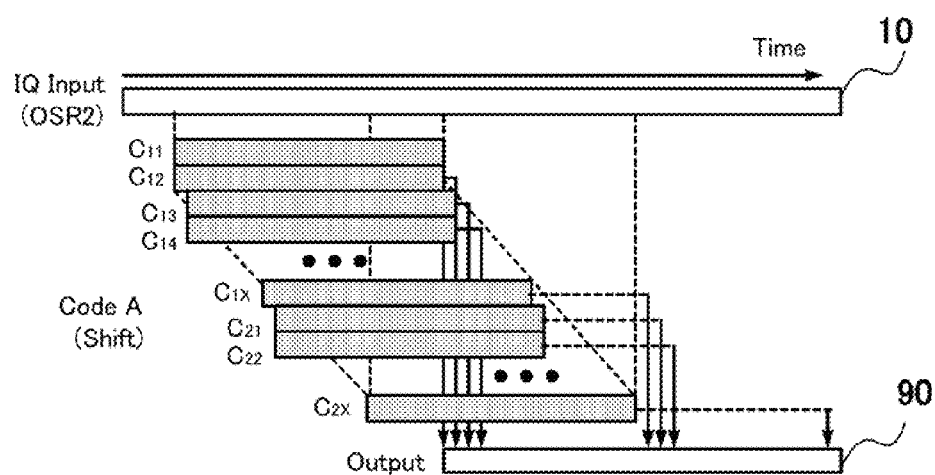
FIG. 15 is a diagram showing parallel operation timing in oversampling processing according to the third mode of implementation of the present invention.

FIG. 15 is a diagram showing an example of operation timing in a case where correlation operation is executed with respect to two samples each in parallel at the time of timing correlation processing at the double oversampling rate (OSR2).

With respect to two samples each of reception data signals (IQ Input (H,L)) obtained at the double oversampling rate (OSR2), operating two adjacent odd-numbered and even-numbered correlators 60 by using the same correlation code at the same timing enables correlation operation to be processed in parallel. This has an advantage of approximately double speed-up of the correlation operation part as compared with processing using the structure of the correlation operation modules 31 through 3N according to the first mode of implementation shown in FIG. 2.

In a case of the correlation operation modules 31 through 3N shown in FIG. 14, the correlation data output control unit 70 executes control to output a correlation result of one sample each such that the structures of the components positioned after the succeeding stage correlation result data output selection unit 90 need no change. Even when the succeeding modules thus remain having the structure for processing one sample each, since the required amount of processing of a correlation operation unit is in general much larger than the amount of processing of a succeeding module, parallel processing of the correlation operation part is very advantageous in terms of speed-up.

In addition, mode setting enables the same operation as that of the first and second modes of implementation. When executing ordinary synchronization processing without oversampling processing (OSR1) by the structure shown in FIG. 14, the input data control unit 10 constantly assigns necessary one sample of a reception data signal (either Odd IQ or Even IQ) among the reception data signals (IQ Input) read from the input data storage memory 11 to both the higher side (H) and the lower side (L) (OSR1) and outputs the same by using the data shaping unit 12.

Then, in each of the correlation operation modules 31 through 3N, the oversample processing correlation code selector 42 is set to select an output of an immediately preceding odd-numbered shift register (delay element) 50 such that all the shift registers (delay elements) 50 operate equivalently to those in the structure shown in FIG. 2 or FIG. 13.

Then, operating all the correlators 60 in the correlation operation modules 31 through 3N at different timing enables correlation operation to be executed one sample by one sample. The operation timing in this case will be equal to the operation timing shown FIG. 4 through FIG. 6. More specifically, in the present mode of implementation, relatively simple circuit expansion is applied to the input data control unit 10 and each of the correlation operation modules 31 through 3N according to the first and second modes of implementation such as addition of the data shaping unit 12, formation of a reception data signal (IQ Input) into two samples and addition of the oversampling processing correlation code selector 42 as shown in FIG. 14 which is the third mode of implementation. This produces a great effect of speeding up correlation operation at the time of double oversampling processing while keeping the same processing as that before expansion be executable.

In particular, provision of the data shaping unit 12 in the input data control unit 10 enables a structure to be attained which has little overhead in circuit scale as compared with a structure where the higher side (H) and the lower side (L) of a reception data signal are selected by each correlator 60. Here, while shown in FIGS. 14 and 15 are examples of parallelization of the double oversampling (OSR2) processing, the third mode of implementation of the present invention is capable of coping with parallelization of four-time or eight-time oversampling processing with ease by the same expansion, and it is apparent that the present invention includes such parallelization.

(Effects of the Third Mode of Implementation)

According to the third mode of implementation, in addition to the above-described effect of the first and second modes of implementation, the effect can be obtained of speeding up synchronization processing at an oversampling rate requiring some amount of arithmetic operation in a synchronization processing circuit in a wireless communication system.

The reason is that in the third mode of implementation, since a plurality of samples of the reception data signals (IQ Input) are in parallel input to each of the correlation operation modules 31 through 3N to operate a plurality of the correlators 60 in parallel by the same correlation code and timing while using the oversampling processing correlation code selector 42, a plurality of reception data signals as many as the number of oversamplings can be processed in parallel while maintaining high operating ratio of each correlator 60. In addition, in synchronization processing at an oversampling rate, since processing capacity is required in proportion thereto in general, enabling parallel processing has a great advantage in satisfying a required processing capacity. In the present exemplary embodiment, such advantage can be obtained by relatively simple circuit expansion including the addition of the data shaping unit 12 to the input data control unit 10 and the addition of the oversampling processing correlation code selector 42 to each of the correlation operation modules 31 through 3N, which involves another advantage in reduced circuit scale overhead for parallel processing.

Lastly, description will be made of a relationship between the number of the correlators 60 to be mounted in each of the correlation operation modules 31 through 3N and the effects. Basically, the number of the correlators 60 in the entire synchronization processing circuit according to the present invention is determined by a relationship between a required amount of processing and an operation clock frequency of each radio system. Then, when the total number of correlators (total number) is determined, for reducing overhead in scale of circuits such as a selection circuit, the number of correlators per one correlation operation module should be large and for increasing the number of combinations of processing assigned, it should be small.

Here, in a case (A) of taking into consideration that the number of processings to be assigned can be flexibly changed, and simplicity of such memory address generation circuits as the input data control unit 10 and the succeeding stage voltage addition unit 100, and the like, the number of correlators is preferably the number of powers of 2 such as two, four, eight and 16. This is because as to flexibility of the number of processings to be assigned, equivalent processing performance can be realized in a case where four correlation operation modules each having four correlators are used at the time of the timing correlation processing and in a case where two correlation operation modules each having eight correlators are used, so that mounting the number of powers of 2 is expected to increase mapping selections. As to the address generation circuit, since when repeatedly generating an address while applying an offset, for example, an offset value is determined by the number of correlators assigned to the processing in question, an offset value calculation circuit can be realized with ease when the number is powers of 2.

On the other hand, in a case (B) of taking an operating ratio of the correlator into consideration, while in the timing correlation processing, the operating ratio is high without depending on the number of correlators, in the code correlation processing, only a specific correlator operates in each correlation operation module, so that when the number of correlators per correlation operation module is large, an operating ratio will be reduced. In a case of the code correlation processing including neighborhood timing, however, when including ±1 samples, it is preferable to mount at least three correlators and when including ±2 samples, mount at least five.

In a case (C) of such a correlation operation module corresponding to oversampling processing as shown in the third mode of implementation, the number of correlators needs to be an even number (a multiple of 2) taking an operating ratio into consideration. Accordingly, since the present invention is directed to flexibly and efficiently cope with various synchronization processings in a plurality of radio systems, (A) making great account of flexibility of the number of processings to be assigned and simplicity of an address generation circuit and also (B) taking into consideration an operating ratio of an arithmetic operation unit (larger than three or five and proximate to the same), it is expected that the largest effects can be obtained by mounting a combination of four or eight correlators. In other words, in a case of the timing correlation processing and also in a case of the code correlation processing including neighborhood timing, high flexibility and efficiency can be realized while maintaining a high arithmetic operation unit operating ratio. When making great account of (B) an operating ratio of the correlator, it is preferable to mount three or five correlators. In a case (C) of the correlation operation module corresponding to the oversampling processing as well, mounting four or eight correlators produces the largest effects and 12 and 16 are also useful, and six is the most preferable taking an operating ratio into consideration.

Although the present invention has been described with respect to the preferred modes of implementation and exemplary embodiment in the foregoing, the present invention is not necessarily limited to the above-described modes of implementation and exemplary embodiment and can be implemented in various modifications within the scope of its technical idea.

What is claimed is:

1. A synchronization processing circuit in a wireless communication system, comprising:
    a plurality of correlation operation units mounted with a plurality of correlators which execute correlation operation,
    a unit which selectively switches, on said correlation operation unit basis, timing correlation processing of shifting a correlation code and transferring the shifted code between adjacent correlators in said correlation operation unit and transferring said shifted correlation code to other adjacent correlation operation unit to execute correlation operation with respect to reception data at different timing in each correlation operation unit and code correlation processing of executing correlation operation with respect to reception data at the same timing in each correlation operation unit by a correlation code individually and externally applied to each correlation operation unit,
    an input data control unit which transfers a desired reception data signal to said plurality of correlation operation units, and
    a correlation result data output selection unit which selects and arbitrates correlation result data from said plurality of correlation operation units and outputs the data to a succeeding stage unit.

2. The synchronization processing circuit according to claim 1, wherein each said correlation operation unit comprises
    a plurality of shift units which shift said correlation code,
    an interface which transfers said correlation code shifted to an adjacent correlation operation unit for timing correlation processing, and
    a first correlation code selection unit which selects an externally applied correlation code and a correlation code transferred from an adjacent correlation operation unit as said correlation code.

3. A synchronization processing circuit in a wireless communication system, comprising
    a plurality of correlation operation units which execute correlation operation, wherein said correlation operation unit comprises
    a plurality of correlators,
    a plurality of shift units which shift a correlation code,
    an interface which transfers said correlation code shifted to an adjacent correlation operation unit for timing correlation processing,
    a first correlation code selection unit which selects an externally and individually applied correlation code for code correlation processing and a correlation code transferred from an adjacent correlation operation unit as said correlation code,
    an input data control unit which transfers a desired reception data signal to said plurality of correlation operation units, and
    a correlation result data output selection unit which selects and arbitrates correlation result data from said plurality of correlation operation units and outputs the data to a succeeding stage unit.

4. The synchronization processing circuit according to claim 1, comprising:
    a reception data storage memory which stores said reception data signal, wherein
    said input data control unit comprises
    an address generation unit which repeatedly enables said reception data signal to be transferred with an offset applied.

5. The synchronization processing circuit according to claim 1, comprising:

as many said input data control units as the number of parallel processings, an input data selection unit provided for each said correlation operation unit for selecting a desired reception data signal from said as many input data control units as the number of parallel processings, and as many said correlation result data output selection units as the number of parallel processings.

6. The synchronization processing circuit according to claim 1, wherein said correlation operation unit comprises a reception data signal interface which receives input of two samples each of reception data signals to connect either one of the reception data signals to said plurality of correlators, and a second correlation code selection unit capable of selecting a correlation code from an immediately preceding stage and a correlation code from last but one preceding stage between adjacent said plurality of shift units.

7. The synchronization processing circuit according to claim 6, wherein said input data control unit comprises a data shaping unit which enables selection between a case of mapping two samples of reception data signals to said reception data signal interfaces for two samples, respectively, and a case of mapping one sample of a reception data signal to both the interfaces and transferring the obtained signal.

8. The synchronization processing circuit according to claim 2, comprising:

a plurality of correlation code generation units, and a correlation code input selection unit for each said correlation operation unit which unit selects a desired correlation code among correlation codes output from said plurality of correlation code generation units.

9. The synchronization processing circuit according to claim 2, wherein said correlation operation unit comprises a clock control unit which executes gating control of an operation clock individually for said plurality of correlators and said plurality of shift units when not in operation.

10. The synchronization processing circuit according to claim 2, wherein said plurality of correlation operation units are each formed of a combination of a correlation operation unit having a complex multiplication type correlator capable of coping with all the correlation codes as said correlator and a correlation operation unit having a complex addition type correlator capable of coping with all the binary correlation codes as said correlator.

11. The synchronization processing circuit according to claim 2, wherein the number of said plurality of correlators and said plurality of shift units in said correlation operation unit is four or eight.

12. The synchronization processing circuit according to claim 2, comprising:

a voltage addition unit which executes voltage addition processing and in-phase addition processing, a voltage calculation unit which calculates electric power, and an averaging processing unit which adds and averages electric power.

13. A synchronization processing method of a synchronization processing circuit in a wireless communication system, wherein in a plurality of correlation operation units mounted with a plurality of correlators which execute correlation operation, selectively switching, on said correlation operation unit basis, timing correlation processing of shifting a correlation code and transferring the shifted code between adjacent correlators in said correlation operation unit and transferring said shifted correlation code to other adjacent correlation operation unit to execute correlation operation with respect to reception data at different timing in each correlation operation unit and code correlation processing of executing correlation operation with respect to reception data at the same timing in each correlation operation unit by a correlation code individually and externally applied to each correlation operation unit, an input data control step of transferring a desired reception data signal to said plurality of correlation operation units, and a correlation result data output selecting step of selecting and arbitrating correlation result data from said plurality of correlation operation units and outputting the selected data to a succeeding stage device.

14. The synchronization processing method according to claim 13, wherein each said correlation operation unit includes the steps of:

shifting said correlation code by a plurality of shift units, transferring said correlation code shifted to an adjacent correlation operation unit for timing correlation processing, and selecting an externally applied correlation code and a correlation code transferred from an adjacent correlation operation unit as said correlation code.

15. A synchronization processing method of a synchronization processing circuit in a wireless communication system, wherein in a plurality of correlation operation units mounted with a plurality of correlators which execute correlation operation, shifting a correlation code by a plurality of shift units, transferring said correlation code shifted to an adjacent correlation operation unit for timing correlation processing, selecting an externally and individually applied correlation code for code correlation processing and a correlation code transferred from an adjacent correlation operation unit as said correlation code, an input data control step of transferring a desired reception data signal to said plurality of correlation operation units, and a correlation result data output selecting step of selecting and arbitrating correlation result data from said plurality of correlation operation units and outputting the selected data to a succeeding stage device.

16. The synchronization processing method according to claim 13, wherein:

at said input data control step, as many said reception data signals are transferred as the number of parallel processings, and said correlation operation unit executes the input data selecting step of selecting a desired reception data signal from said as many reception data signals as said number of parallel processings.

17. The synchronization processing method according to claim 13, wherein said correlation operation unit executes the correlation code selecting step of receiving input of two samples each of reception data signals, connecting either one of the reception data signals to said plurality of correlators, and selecting a correlation code from an immediately preceding stage and a correlation code from last but one preceding stage between adjacent said plurality of shift units.

18. The synchronization processing method according to claim 17, wherein said input data control step has the data shaping step of selecting a case of mapping two samples of reception data signals to reception data signal interfaces for two samples, respectively, and a case of mapping one sample of a reception data signal to both the interfaces and transferring the obtained signal.

19. The synchronization processing method according to claim 14, wherein said correlation operation unit executes clock control of executing gating control of an operation clock individually for said plurality of correlators and said plurality of shift units when not in operation.

* * * * *